United States Patent [19]

Haren

[11] 4,226,911

[45] Oct. 7, 1980

[54] MICROPOROUS ELASTOMERIC MATERIAL AND METHOD OF MANUFACTURE

[75] Inventor: Doyle V. Haren, Clyde, N.C.

[73] Assignee: Dayco Corporation, Dayton, Ohio

[21] Appl. No.: 15,098

[22] Filed: Feb. 26, 1979

Related U.S. Application Data

[63] Continuation-in-part of Ser. No. 884,792, Mar. 9, 1978, abandoned.

[51] Int. Cl.³ ............... B41J 27/20; B29D 27/00
[52] U.S. Cl. .................... 428/375; 101/327; 101/401.1; 264/45.3; 264/49; 428/304; 428/309; 428/401; 428/906; 428/909
[58] Field of Search ............... 264/49, 45.3, DIG. 17; 428/375, 304, 309, 906, 908, 909, 401; 521/61

[56] References Cited

U.S. PATENT DOCUMENTS

| | | | |
|---|---|---|---|
| 2,467,214 | 4/1949 | Luaces | 264/DIG. 17 |
| 2,819,993 | 1/1958 | Gregory | 264/DIG. 17 |
| 2,822,627 | 2/1958 | Seiberling | 264/DIG. 17 |
| 3,928,521 | 12/1975 | Haren et al. | 264/49 |
| 4,025,685 | 5/1977 | Haren et al. | 427/243 X |

*Primary Examiner*—Philip Anderson
*Attorney, Agent, or Firm*—Reuben Wolk; Charles E. Bricker

[57] ABSTRACT

A method of making a microporous elastomeric material having interconnecting cavities and which may be used as an ink dispensing article is provided wherein such material is made by the steps of admixing fibrous material and particles of hydrated magnesium sulfate in an elastomeric matrix material, shaping the material, curing the elastomeric matrix material, simultaneously causing liberation of water of crystallization from the hydrated magnesium sulfate which provides a blowing effect resulting in the formation of interconnecting passages between the particles from the cured material.

23 Claims, 3 Drawing Figures

MICROPOROUS ELASTOMERIC MATERIAL AND METHOD OF MANUFACTURE

This is a continuation-in-part of application Ser. No. 884,792, filed Mar. 9, 1978 now abandoned.

This invention relates to microporous elastomeric materials.

BACKGROUND OF THE INVENTION

Microporous elastomeric materials are widely used for various purposes such as ink dispensing rollers, pads and the like. These materials can be made using methods or processes which employ non-hydrated soluble salts such as sodium chloride or sodium nitrate, or a hydrated salt such as magnesium sulfate as disclosed by Haren and Logan, U.S. Pat. No. 3,928,521.

While these microporous elastomeric materials are adequate for most uses, it has been found that when used in high speed printing equipment the type faces tear chunks of the material from the ink dispensing roller or pad.

Accordingly it is an object of this invention to provide a microporous elastomeric material having improved abrasion resistance.

Another object is to provide a method for making such microporous elastomeric material.

Yet another object is to provide a composition which can be vulcanized to form a microporous vulcanizate.

Other objects, aspects and advantages of the present invention will be apparent to those skilled in the art from a reading of the following detailed description, the appended claims and the attached drawing.

SUMMARY OF THE INVENTION

In accordance with the present invention there is provided a microporous elastomeric material suitable for dispensing ink and other liquid materials which comprises an elastomeric material having interconnecting pores as cavities throughout which is reinforced by a plurality of fibers dispersed uniformly therethrough.

The microporous elastomeric material of this invention is made by a method which comprises the steps of admixing fibers and particles of hydrated magnesium sulfate in an elastomeric matrix material, forming the resulting material into a desired shape, curing the formed material and simultaneously causing liberation of the water of crystallization from the hydrated magnesium sulfate. This liberation of water provides a blowing effect resulting in the formation of interconnecting passages between the salt particles. The salt particles are thereafter leached from the matrix material. The leaching is achieved in an accelerated manner due to the interconnecting passages.

BRIEF DESCRIPTION OF THE DRAWING

The accompanying drawing shows present exemplary embodiments of this invention, in which.

DETAILED DESCRIPTION

Figure 1:
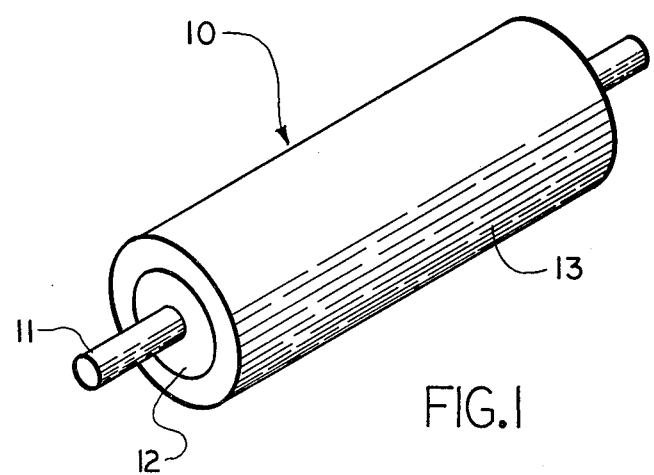
FIG. 1 is a perspective view illustrating an exemplary ink dispensing roll made using the method of this invention.

Reference is now made to FIG. 1 of the drawing which illustrates an exemplary ink-dispensing article or roll which is designated generally by the reference numeral 10. The roll 10 has a central shaft 11 provided with a cylindrical supporting portion 12 which is detachably fixed concentrically around the shaft 11 and an outer tubular microporous elastomeric material in the form of a microporous rubber material 13 is fixed against the supporting portion 12. The material 13 is made utilizing the method of this invention and is suitably filled or saturated with ink, or the like, in accordance with techniques which are well known in the art and as will be described in more detail subsequently.

Figure 2:
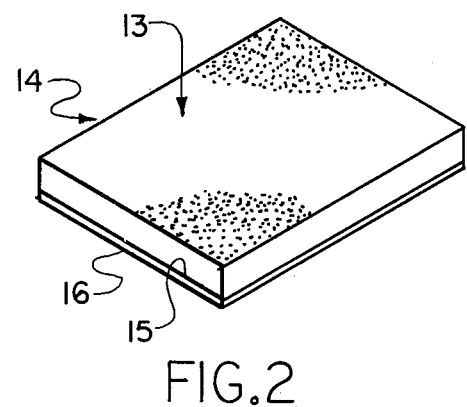
FIG. 2 is a fragmentary perspective view illustrating an exemplary ink dispensing pad made using the method of this invention.

Another exemplary ink-dispensing article in the form of a pad is shown in FIG. 2 and such pad is designated generally by the reference numeral 14. The pad employs a microporous rubber material which is also designated by the reference numeral 13 and the material 13 is fixed by a suitable adhesive means 15 to a comparatively rigid supporting plate which is shown as a metal plate 16 and in accordance with techniques which are well known in the art.

Figure 3:
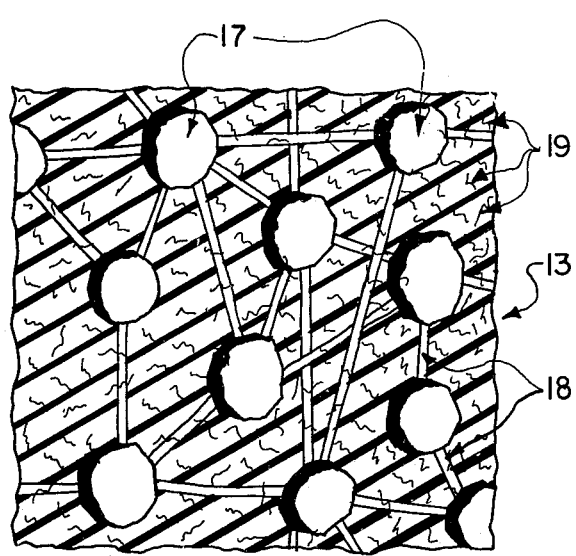
FIG. 3 is an enlarged fragmentary cross-sectional view of the microporous elastomeric material of this invention illustrating, in exaggerated manner, cavities which, for convenience of drawing, are of roughly equal size interconnected by numerous internal channels.

The microporous rubber material or composition 13 comprising the ink dispensing roll 10 and the ink dispensing pad 14 is illustrated in FIG. 3 and has a plurality of cavities 17 which are interconnected by internal passages or channels 18 generally of different sizes. The cavities 17 have different irregular shapes, determined by the manner in which they are formed, and may be of roughly equal size or different sizes. The microporous rubber material 13 also has a plurality of discrete reinforcing fibers, designated generally by the reference numeral 19. The microporous material 13 is capable of dispensing ink, or similar substances, in a uniform manner and in a manner which is considered superior to previously proposed microporous elastomeric materials. The microporous material 13 is also capable of taking up more ink, or other liquid substance, than the previously proposed microporous elastomeric materials.

The unique method of making the microporous elastomeric material 13 will now be described in detail. In particular, sized particles of hydrated magnesium sulfate are provided and such particles may be provided by grinding action with the sizing being achieved employing a suitable mechanical screen, or the like. Also provided are discrete fibers of a natural or synthetic material, of suitable size.

The sized particles of hydrated magnesium sulfate and the fibers are then suitably admixed in an elastomeric matrix material and, although any known technique may be employed to achieve the mixing action, such mixing is preferably achieved by introducing the sized particles together with the fibers and the elastomeric or rubber compound in a Banbury to define a loaded rubber matrix, i.e., a rubber matrix material loaded with sized particles of hydrated magnesium sulfate and fibers.

The loaded rubber matrix material is formed into a desired shape, then cured and leached. During the curing of the elastomeric rubber material there is a substantially simultaneous liberation of water of crystallization from the hydrated magnesium sulfate which provides a blowing effect resulting in the formation of the interconnecting passages 18 between the particles of magnesium sulfate. During the leaching of the particles from the matrix material the leaching is achieved in an accelerated manner due to the numerous interconnecting passages 18 which make possible a more efficient leaching action to thereby completely define microporous material 13 having cavities 17 interconnected by passages 18 and having fibers 19 dispersed therethrough. The cured and leached rubber material with the interconnected microporous cavities defined therein is suitably rinsed to remove any residual magnesium sulfate which may be present thereon whereupon any residual water is removed from the microporous material 13 by hot air drying. The drying process may be accelerated, if desired, by prior removal of excess water by mechanical action such as squeezing, or by other suitable means.

Following air drying of the material 13 an ink dispensing article is made and this may be achieved by making a tubular member for the roll 10 which as indicated previously is designated by the numeral 13 or a flat member for the pad 14 which is also designated by the numeral 13.

It should be appreciated that the tubular member 13 of the roll 10 may be made by any suitable technique known in the art, including by extrusion thereof in tubular form using the loaded material prior to curing and leaching or by suitably forming a flat sheet which is cured, leached, and then wrapped in tubular form around the supporting portion 12 and fixed thereto. However, regardless of the manner in which the tubular member 13 is made or formed it is suitably fixed to the supporting rotatable support or hub portion 12 in accordance with well known techniques to complete the ink-dispensing roll 10.

Similarly, the microporous elastomeric sheet portion 13 is suitably cut to the desired configuration and fixed by adhesive means 15 to the support plate 16 using any known technique to define the ink-dispensing pad 14.

Once the microporous material 13 is fixed or bonded in position on its associated roll 10 or pad 14, ink is loaded therein using any technique which is known in the art. Depending on the ink used and the detailed character of the elastomeric material, the ink may be heated to a predetermined temperature such as 150° F., for example, to facilitate saturation thereof in the material 13. Also vacuum and/or pressure may be used to facilitate saturation.

The material 13 illustrated and described in this disclosure of the invention is cross-hatched in the drawing as a rubber material and such rubber material may be either a natural rubber or a synthetic rubber compound. However, it is to be understood that any suitable elastomeric material may be used to define the microporous material of this invention.

The hydrated magnesium sulfate preferably contains 7 molecules of water of crystallization per molecule of magnesium sulfate. This material is commercially available as "Epsom salt." It will be appreciated that hydrate magnesium sulfate containing other than 7 molecules of water of hydration may also be used.

The particle size of the hydrated magnesium sulfate is a matter of choice depending upon the size of the cavities as pores desired in the resulting microporous material. A preferred particle size is "100 mesh," based upon what is considered to be the largest pore size which will yield a satisfactory balance between the ink pickup characteristics, ink feed to a surface being inked, and freedom from so-called "misting" or ink spin-off when running. The hydrated magnesium sulfate particles may, however, be as small as 200 mesh size or larger than 100 mesh.

A typical screen analysis of "100 mesh" particles is presented below where the 100 mesh screen has an aperture measuring 0.0058 inch square, while the 140 mesh screen has an aperture measuring 0.0041 inch square.

Particles retained on 80 mesh screen: 0.0%
Particles retained on 100 mesh screen: 5.0%
Particles retained on 140 mesh screen: 13.7%

From the above screen analysis, it is seen that 95% of all the material is smaller than 100 mesh, while 81.3% is smaller than 140 mesh.

The amount of hydrated magnesium sulfate used in making the material 13 can range from 0.5 to 80% of the total volume of such material, preferably from 40 to 75 volume percent.

The fibers 19 can be natural or synthetic fibers, such as cotton, rayon, nylon, aramid, polyester, fluoro-carbon or the like, including mixtures thereof. The size of these fibers can range from a diameter of about 0.0005 to about 0.004 inch, preferably about 0.0008 to about 0.0024 inch; and a length of about 0.005 to about 0.250 inch, preferably about 0.010 to about 0.075 inch.

The amount of such fibers dispersed in the material 13 can range from 1 to 100 parts by weight of fiber per 100 parts by weight of elastomer, preferably about 10 to 40 parts and more preferably about 20 parts.

As mentioned previously the fibers and the hydrated magnesium sulfate are thoroughly admixed with the elastomeric material using suitable equipment, such as a roll mill or Banbury.

The loaded matrix material can be cured and leached in a single step or in separate steps using any procedures known in the art. It is convenient to carry out the curing and leaching in a single step by immersing the material in hot water for a suitable time and at a suitable temperature. It will be recognized by those skilled in the art that the time and temperature for curing and leaching will vary according to the dimensions of the article being processed and the type of elastomer and curing ingredients employed. In general, the time required for single-step curing and leaching will range from 1 to 72 hours and the temperature of the hot water employed will range from 150° to 350° F.

Following curing and leaching, any residual salt is rinsed from the article using tap water at ambient temperature for about 1 to 30 minutes. The article is thereafter dried under conditions sufficient to drive off any residual water. In general, any residual water can be driven off by heating the article in an oven at a temperature in the range of 300° to 350° F. at atmospheric pressure.

The fiber reinforced microporous elastomeric material of this invention has improved cut resistance, reduced elongation, lower coefficient of friction and improved abrasion resistance as compared to a non-reinforced microporous material.

The following example illustrates the invention:

Microporous rubber stocks were prepared by blending together the following ingredients, in parts by weight:

TABLE I

|  | A | B |
|---|---|---|
| Nitrile elastomer[1] | 100 | 100 |
| Zinc Oxide | 10 | 10 |

TABLE I-continued

|  | A | B |
|---|---|---|
| Sulfur | 1.5 | 1.5 |
| DOP | 30 | 30 |
| Plasticizer[2] | 15 | 15 |
| MBT | 0.5 | 0.5 |
| TMTD | 4.5 | 4.5 |
| Stearic Acid | 2 | 2 |
| Epsom Salt (100 mesh) | 500 | 500 |
| HAF Carbon Black | 10 | 10 |
| Nylon Flock | — | 20 |

[1] Butadiene-acrylonitrile copolymer containing about 28% acrylonitrile.
[2] Coldflex 1000 available commercially from ABCHEM, Inc., Washington, PA.

After blending, the stocks were formed into cylindrical shapes, then vulcanized by immersing them in water heated to about 300° F. in a vulcanizing chamber for about 45 minutes. The vulcanized shapes were then rinsed in tap water to remove any residual salt and thereafter dried. The dried shapes were ground to provide rollers having the dimensions: I.D. 0.815 inch; O.D. 1.687 inch; length 5 inches.

The rollers were tested for ink pickup. The results are given in Table II below. The rollers A and B were simultaneously impregnated with ink by subjecting the rollers to vacuum, followed by soaking in the inks.

TABLE II

|  | Roller weight (grams) before inking | Ink pickup (grams) | Weight of ink (grams) per gram of roller |
|---|---|---|---|
| Red Ink: |  |  |  |
| Roller A | 89 | 65 | 0.73 |
|  | 82 | 84 | 1.02 |
| Roller B | 69 | 86 | 1.25 |
|  | 69 | 92 | 1.33 |
| Black Ink |  |  |  |
| Roller A | 82 | 28 | 0.34 |
|  | 80 | 30 | 0.38 |
| Roller B | 70 | 70 | 1.00 |
|  | 68 | 66 | 0.97 |

The above data illustrate the unexpectedly greater ink pickup of Roller B, containing nylon flock, as compared to the unflocked Roller A.

Reasonable modifications are possible within the scope of this disclosure without departing from the scope and spirit thereof.

I claim:

1. An article capable of taking up and dispersing a liquid substance which comprises an elastomeric matrix having interconnecting cavities distributed therethrough and having from about 1 to about 100 parts per 100 parts by weight of elastomeric material of discrete fibers dispersed therethrough, said fibers having a diameter in the range of about 0.0005 to about 0.004 inch and a length in the range of about 0.005 to about 0.250 inch, wherein said fibers increase the liquid take-up and dispensing capability of said article.

2. The article of claim 1 wherein said elastomeric matrix is a rubber.

3. The article of claim 2 wherein said rubber is a butadiene-acrylonitrile copolymer containing about 28 percent acrylonitrile.

4. The article of claim 1 wherein the amount of said fibers is in the range of about 10 to about 40 parts.

5. The article of claim 1 wherein the amount of said fibers is about 20 parts.

6. A method of making a microporous elastomeric article having increased liquid take-up and dispensing capability comprising the steps of preparing an elastomeric matrix material by admixing an elastomeric material, from about 0.5 to 80 volume percent of sized particles of hydrated magnesium sulfate, from about 1 to about 100 parts by weight per 100 parts by weight of said elastomeric material of discrete fibers and vulcanizing ingredients, forming said matrix material into a desired shape, curing the resulting shaped matrix material while simultaneously causing liberation of waters of crystallization from said hydrated magnesium sulfate which provides a blowing effect providing the formation of interconnecting passages between said particles, leaching said particles from said matrix material and thereafter recovering the cured microporous article having said fibers dispersed therethrough, wherein said fibers increase the liquid take-up and dispensing capability of said cured articles.

7. The method of claim 6 wherein the amount of said fibers is in the range of about 10 to about 40 parts.

8. The method of claim 6 wherein the amount of said fibers is about 20 parts.

9. The method of claim 6 wherein said curing and leaching steps are achieved in a simultaneous manner.

10. The method of claim 6 wherein said preparing step comprises grinding and sizing hydrated magnesium sulfate containing 7 molecules of magnesium sulfate.

11. The method of claim 10 wherein said magnesium sulfate is ground and sized to provide particles wherein about 95% of said particles pass through a 100 mesh screen and about 81% of said particles pass through a 140 mesh screen.

12. The method of claim 6 wherein said leaching step further comprises the step of rinsing the cured and leached material.

13. The method of claim 9 wherein said curing and leaching steps are achieved using hot water at a temperature in excess of 150° F.

14. The method of claim 12 wherein said recovering step comprises drying the cured, leached and rinsed material at a temperature in the range of about 300° to 350° F.

15. A composition vulcanizable to form a microporous vulcanizate comprising an elastomeric material having substantially uniformly dispersed throughout from 0.5 to about 80 volume percent of hydrated magnesium sulfate particles and from 1 to about 100 parts of discrete fibers per 100 parts by weight of said elastomeric material, said fibers having a diameter in the range of about 0.0005 to about 0.004 inch and a length in the range of about 0.005 to about 0.250 inch, together with vulcanizing ingredients including sulfur sufficient to convert the unvulcanized composition on curing to said vulcanizate, wherein said fibers increase the liquid take-up and dispersing capability of the resulting vulcanizate.

16. The composition of claim 1 wherein said elastomeric material is rubber.

17. The composition of claim 2 wherein said elastomeric material is a butadiene-acrylonitrile copolymer containing about 28 percent acrylonitrile.

18. The composition of claim 1 wherein said magnesium sulfate contains 7 molecules of water of crystallization per molecule of magnesium sulfate.

19. The composition of claim 1 wherein said hydrated magnesium sulfate has a particle size of about 100 mesh.

20. The composition of claim 1 wherein the amount of said hydrated magnesium sulfate is in the range of about 40 to 75 volume percent.

21. The composition of claim 1 wherein said fibers are nylon flock.

22. The composition of claim 1 wherein the amount of said fibers is about 20 parts.

23. The composition of claim 1 wherein the amount of said fibers is in the range of about 10 to about 40 parts.

* * * * *